United States Patent
David et al.

(10) Patent No.: US 7,067,047 B2
(45) Date of Patent: Jun. 27, 2006

(54) ELECTRO-DIP COATING METHOD

(75) Inventors: Norbert David, Heiligenhaus (DE); Klausjörg Klein, Wuppertal (DE); Walter Kühhibi, Remscheid (DE)

(73) Assignee: E. I. duPont de Nemours and Company, Wilmington, DE (US)

( * ) Notice: Subject to any disclaimer, the term of this patent is extended or adjusted under 35 U.S.C. 154(b) by 608 days.

(21) Appl. No.: 10/148,708

(22) PCT Filed: Nov. 29, 2000

(86) PCT No.: PCT/EP00/11951

§ 371 (c)(1),
(2), (4) Date: Oct. 3, 2002

(87) PCT Pub. No.: WO01/40550

PCT Pub. Date: Jun. 7, 2001

(65) Prior Publication Data

US 2004/0089549 A1    May 13, 2004

(30) Foreign Application Priority Data

Dec. 4, 1999   (DE) ................................ 199 58 487

(51) Int. Cl.
*C25D 13/10* (2006.01)
(52) U.S. Cl. ....................... 204/488; 204/500; 204/509
(58) Field of Classification Search ................ 204/488, 204/500, 509; 428/626
See application file for complete search history.

(56) References Cited

FOREIGN PATENT DOCUMENTS

| EP | 0476821 A2 | * | 3/1992 |
| JP | 52-127930 A | * | 10/1977 |
| JP | 02-245269 A | * | 10/1990 |

* cited by examiner

*Primary Examiner*—Kishor Mayekar
(74) *Attorney, Agent, or Firm*—Steven C. Benjamin

(57) ABSTRACT

Use of water-insoluble organic nitrites and/or nitrates as additives for electrodeposition coating compositions, and process for the production of an electrodeposition lacquer with improved adhesion for subsequent coats in which one or more water-insoluble organic nitrites and/or nitrates is added to the electrodeposition coating composition and the coating film obtained by electrodeposition is stoved in an indirectly heated circulating air oven.

9 Claims, No Drawings

ELECTRO-DIP COATING METHOD

This application is a 35 USC 371 National Stage application of PCT/EP00/11951 filed Nov. 29, 2000.

BACKGROUND OF THE INVENTION

The invention concerns a process for cathodic electrodeposition coating (CEC) using water-insoluble organic nitrites and/or nitrates as additives for the cathodic electrodeposition coating compositions in order to improve the adhesion of subsequent coats to coatings produced from them.

Cathodic electrodeposition lacquers (CEC lacquers) are used in particular for producing anti-corrosive primers on metallic substrates, such as car bodies for example. The coating films deposited from electrodeposition lacquers by electrodeposition are then stoved in large circulating air ovens, which can be heated directly or indirectly, and provided with further coating films. Directly heated circulating air ovens are heated by combustion of natural gas, for example, whereby the waste gases are introduced into the circulating air of the oven. In circulating air ovens heated indirectly by means of heat exchangers, no waste gases are introduced into the circulating air of the oven.

It has been established in industrial practice that the adhesion of subsequent coating films applied to stoved cathodic electrodeposition coating films, especially underbody sealant films, is often inadequate if the cathodic electrodeposition primer has been stoved in indirectly heated circulating air ovens.

The object of the invention is the improvement or provision of an adequate adhesion of coating films to cathodic electrodeposition coating films that have previously been stoved in indirectly heated circulating air ovens. This applies particularly in connection with underbody sealant films for application onto cathodic electrodeposition coating films.

The object can be achieved if cathodic electrodeposition lacquers containing scarcely volatile or non-volatile, water-insoluble organic nitrites and/or nitrates are used for cathodic electrodeposition coating films that are to be stoved in indirectly heated circulating air ovens following electrodeposition.

Although JP 52127930 describes electrodeposition coating compositions that can contain various cellulose derivatives, such as e.g. cellulose nitrate, no reference is made to an improvement of the adhesion of subsequent coats to coatings obtained from electrodeposition coating compositions containing organic nitrite and/or nitrate.

DE 36 14 599 C describes a process for stoving cathodic electrodeposition lacquers containing flow-promoting additives in an indirectly heated oven, whereby fillers or underbody sealants for example are applied to the stoved electrodeposition lacquer. A content of nitrogen oxides of at least 1 $mg/m^3$ is established in the oven. This minimum content of nitrogen oxides is necessary to improve the adhesion between the cathodic electrodeposition film and the other coats.

SUMMARY OF THE INVENTION

The present invention provides a process for producing an electrodeposition coating film with improved adhesion for subsequent coats by cathodic deposition of a coating film from a cathodic electrodeposition coating composition onto an electrically conductive substrate and stoving, characterised in that one or more water-insoluble organic nitrites and/or nitrates is added to the cathodic electrodeposition coating composition and stoving is performed in an indirectly heated circulating air oven, whereby the proportion of fresh air introduced into the circulating air oven is 0 to 20 vol. % of the air in the oven.

The invention also provides a process in which a subsequent coat, in particular a conventional underbody sealant film, is applied to the coating film obtained as above.

DETAILED DESCRIPTION OF THE INVENTION

The expression "water-insoluble organic nitrites and/or nitrates" is substituted below by the abbreviated form "nitrites and/or nitrates".

The cathodic electrodeposition coating compositions used according to the invention are aqueous coating compositions having a solids content of for example 10 to 30 wt. %. The solids content in the cathodic electrodeposition coating compositions is formed from the resin solids, pigments, fillers, other conventional lacquer additives and the content of nitrites and/or nitrates that is substantial to the invention. The resin solids in the cathodic electrodeposition coating compositions consist of the binder(s) and any crosslinker resin(s) that is/are optionally included. Any pigment paste resins (paste resins) optionally included in the cathodic electrodeposition coating compositions are counted with the binders. At least a part of the binders carries ionic substituents and/or substituents capable of conversion to ionic groups. The binders can be self-crosslinking or externally crosslinking, in the latter case they carry groups capable of chemical crosslinking and the cathodic electrodeposition coating compositions then contain crosslinking agents. The crosslinking agents can also display ionic groups.

The ionic groups or groups of ionic binders capable of conversion to ionic groups are cationic groups or groups capable of conversion to cationic groups, e.g. basic groups, preferably nitrogen-containing basic groups; these groups can be in quaternised form or are converted to cationic groups with a conventional neutralising agent, e.g. a sulfonic acid such as amidosulfonic acid or methane sulfonic acid or an organic monocarboxylic acid, such as formic acid, acetic acid or lactic acid. Examples are amino, ammonium, e.g. quaternary ammonium, phosphonium and/or sulfonium groups. Amino groups that are present can be primary, secondary and/or tertiary. The groups that can be converted to ionic groups can be in partially or wholly neutralised form.

The binders carry conventional functional groups capable of chemical crosslinking, for example hydroxyl groups, corresponding for example to a hydroxyl value of 30 to 300, preferably 50 to 250 mg KOH/g.

The cathodic electrodeposition coating compositions used according to the invention are known per se. They contain conventional binders that are capable of cathodic deposition, for example resins containing primary, secondary and/or tertiary amino groups. Their amine values are 20 to 250 mg KOH/g, for example. The weight-average molecular weight (Mw) of these cathodic electrodeposition binders is preferably 300 to 10,000. The resins can be converted to the aqueous phase after quaternisation or neutralisation of at least a part of the basic groups. Examples of such cathodic electrodeposition binders are aminoepoxy resins, aminoepoxy resins with terminal double bonds, aminoepoxy resins with primary OH groups, aminopolyurethane resins, amino group-containing polybutadiene resins and/or modified epoxy resin-carbon dioxide-amine reaction products and amino(meth)acrylate resins. The cathodic electrodeposition binders can be self-crosslinking by conventional means or they are used in combination with known crosslinking agents. Examples of such crosslinking agents are amino resins, blocked polyisocyanates, crosslinking agents with terminal double bonds, polyepoxy compounds or crosslinking agents containing groups capable of interesterification.

The cationic binders can be used as a cathodic electrodeposition binder dispersion, which can contain crosslinking agents, to produce the cathodic electrodeposition coating compositions used according to the invention. Cathodic electrodeposition binder dispersions can be produced by synthesis of cathodic electrodeposition binders in the presence or absence of organic solvents and conversion to an aqueous dispersion by dilution with water of the cathodic electrodeposition binders neutralised with neutralising agent. The cathodic electrodeposition binder(s) can be mixed with one or more suitable crosslinking agents and converted along with these into the aqueous dispersion. Organic solvent, if present, can be removed down to the desired content before or after conversion to the aqueous dispersion, by vacuum distillation for example. The subsequent removal of solvents can be avoided for example if the cathodic electrodeposition binders optionally combined with crosslinking agents are neutralised with neutralising agent in a low-solvent or solvent-free state, e.g. as a solvent-free melt at temperatures of up to 140° C. for example and then converted to the cathodic electrodeposition binder dispersion with water. Removal of organic solvents can likewise be avoided if the cathodic electrodeposition binders are prepared as absolution in one or more radically polymerisable, olefinically unsaturated monomers or if the binders are synthesised in one or more radically polymerisable monomers (e.g. styrene) as solvent, are then converted to an aqueous dispersion by neutralising with neutralising agent and diluting with water and the radically polymerisable monomers are then removed by polymerisation.

The cathodic electrodeposition coating compositions used according to the invention contain nitrites and/or nitrates particularly in a sufficient quantity such that a coating film, in particular an underbody sealant film for example, subsequently applied to the cathodic electrodeposition coating film stoved in an indirectly heated circulating air oven displays an adequate adhesion. The nitrites and/or nitrates are contained in the cathodic electrodeposition coating compositions corresponding for example to a content of 0.05 to 0.5 wt. % nitrogen in the form of organically bonded nitrite and/or nitrate, relative to the resin solids.

The nitrites and/or nitrates are esters of nitrous acid or of nitric acid with alcohols, such as e.g. low-molecular mono- or polyalcohols, but particularly esters of nitrous acid or of nitric acid of mono- or polyhydroxy-functional polymers. Nitrates are preferred.

In particular they are compounds that are scarcely volatile or non-volatile under the conditions of formulation and application and of stoving of the electrodeposition lacquers. By reason of their water-insolubility the nitrites and/or nitrates can be deposited together with the other components constituting the solids in the cathodic electrodeposition coating composition by electrodeposition from the cathodic electrodeposition coating compositions onto electrically conductive substrates.

An example of a nitrate that is particularly preferably used in the cathodic electrodeposition coating compositions used according to the invention is cellulose nitrate with a nitrogen content in the form of organically bonded nitrate of 6.7 to 12.5, preferably 10.5 to 12.5 wt. %. If the particularly preferred cellulose nitrate with a nitrogen content of 10.5 to 12.5 wt. % is used as a non-volatile, water-insoluble organic nitrate in the cathodic electrodeposition coating compositions used according to the invention, its content is for example 1 to 4 wt. %, relative to the resin solids in the cathodic electrodeposition coating composition. For the purposes of the present invention cellulose nitrate can be used as a product wetted with alcohol, for example butanol, or as an organic solution in solvents such as e.g. alcohols, esters, ketones, glycol ethers, glycol esters, glycol ether esters and mixtures thereof. If there is no objection to plasticisers in the cathodic electrodeposition coating, commercial cellulose nitrate desensitised with plasticiser can also be used for the purposes of the present invention.

As is described in more detail below, the nitrites and/or nitrates can be added to the cathodic electrodeposition coating compositions in various ways, for example at the start during production of the cathodic electrodeposition coating compositions used according to the invention or subsequently, for example directly before or during use in electrodeposition coating.

In addition to the binder(s), water and the content of nitrites and/or nitrates that is substantial to the invention and the crosslinking agent that is optionally present, the cathodic electrodeposition coating compositions used according to the invention can contain pigments, fillers, solvents and/or conventional lacquer additives.

Examples of pigments are conventional inorganic and/or organic pigments, such as e.g. titanium dioxide, iron oxide pigments, carbon black. Examples of fillers are kaolin, talc or silicon dioxide. The cathodic electrodeposition coating compositions can also contain anti-corrosive pigments. Examples of these are zinc phosphate or organic corrosion inhibitors.

Pigments and/or fillers can be dispersed in a part of the binder and then ground in a suitable unit, e.g. a bead mill, after which the process is completed by mixing with the outstanding portion of binder. The cathodic electrodeposition coating composition or bath can then be produced from this material by dilution with water—after addition of neutralising agent if this has not already taken place (one-component procedure).

Pigmented cathodic electrodeposition coating compositions or baths can also be produced by mixing a cathodic electrodeposition binder dispersion and a separately produced pigment paste, however (two-component procedure). To this end a cathodic electrodeposition binder dispersion is further diluted with water, for example, and an aqueous pigment paste then added. Aqueous pigment pastes are produced by methods known to the person skilled in the art, preferably by dispersing the pigments and/or fillers in paste resins conventionally used for these purposes.

The ratio by weight of pigment plus filler/binder plus crosslinking agent in the cathodic electrodeposition coating compositions used according to the invention is for example from 0:1 to 0.8:1, for pigmented lacquers it is preferably between 0.05:1 and 0.4:1.

The cathodic electrodeposition coating compositions used according to the invention can optionally contain other additives in addition to the nitrites and/or nitrates, for example in proportions of 0.1 to 5 wt. %, relative to the resin solids. These are in particular such examples that are known for cathodic electrodeposition coating compositions, for example wetting agents, neutralising agents, flow control agents, catalysts, corrosion inhibitors, antifoam agents, light stabilisers, antioxidants, and conventional anti-crater additives. The additives can be introduced into the cathodic electrodeposition coating compositions in any way at all, for example during binder synthesis, during production of cathodic electrodeposition binder dispersions, by means of a pigment paste or separately.

The cathodic electrodeposition coating compositions used according to the invention can also contain conventional solvents in the conventional proportions for cathodic electrodeposition coating compositions. Such conventional solvents for cathodic electrodeposition coating compositions are for example glycol ethers, such as butyl glycol and ethoxy propanol, and alcohols, such as butanol. The solvents can be introduced into the cathodic electrodeposition coating compositions by various means, for example as a component of binder or crosslinking agent solutions, via a cathodic electrodeposition binder dispersion, as a component of a pigment paste or by separate addition. The solvent content of the cathodic electrodeposition coating compositions is for example from 0 to 5 wt. % inclusive, relative to cathodic electrodeposition bath capable of being used for coating.

The cathodic electrodeposition coating compositions used according to the invention can be prepared by the known methods for producing cathodic electrodeposition baths, i.e. in principle both by means of the one-component procedure described above and by means of the two-component procedure.

The cathodic electrodeposition coating compositions used according to the invention can be produced for example in such a way that the nitrites and/or nitrates are mixed as supplied or as an organic solution with the other components of the cathodic electrodeposition coating composition. The nitrites and/or nitrates can be added to the cathodic electrodeposition coating compositions in various ways, for example at the start during production of the cathodic electrodeposition coating compositions or subsequently.

For example they are first mixed with binders before the other components are incorporated.

Production of the cathodic electrodeposition coating compositions used according to the invention by the one-component procedure can be performed for example in such a way that the nitrites and/or nitrates are in the presence of the components of the cathodic electrodeposition coating composition that are in the non-aqueous phase and are converted with them to the aqueous phase by dilution with water. Pigments and/or fillers can for example be dispersed in a part of the binder and/or crosslinking agent and then ground in a suitable unit, e.g. a bead mill, after which the process is completed by mixing with the outstanding portion of binder and/or crosslinking agent. The nitrites and/or nitrates can be included in the binder and/or crosslinking agent used for dispersion and/or for completion. The cathodic electrodeposition coating composition or bath can then be produced from the material thus obtained by dilution with water—after addition of neutralising agent if this has not already taken place.

Production of the cathodic electrodeposition coating compositions by the two-component procedure can also be performed for example in such a way that the nitrites and/or nitrates are in the presence of the ionic binders that are in the non-aqueous phase and are converted to the aqueous phase along with them by dilution with water—after addition of neutralising agent if this has not already-taken place. A cathodic electrodeposition binder dispersion containing the nitrites and/or nitrates is obtained in this process. A pigmented cathodic electrodeposition coating composition or bath can then be produced from a cathodic electrodeposition binder dispersion thus obtained by mixing with a separate pigment paste. Alternatively, the two-component procedure can also be performed in such a way that an aqueous pigment paste containing nitrites and/or nitrates is added to a cathodic electrodeposition binder dispersion.

The nitrites and/or nitrates can also be added separately to the cathodic electrodeposition coating compositions. It is also possible for example to perform the separate addition subsequently, to cathodic electrodeposition baths ready for coating. The nitrites and/or nitrates are converted to a water-dilutable form for this purpose; the separate, in particular subsequent addition can for example be performed as part of an aqueous pigment paste, produced separately for example, or the nitrites and/or nitrates can be added by means of a water-dilutable binder, in particular as a component of a cathodic electrodeposition binder dispersion or in an aqueous cathodic electrodeposition paste resin or with the aid of suitable emulsifiers, for example by the principles described in the previous paragraph.

According to the invention cathodic electrodeposition coating films for example in a dry film thickness of 10 to 30 $\mu$m are applied to various electrically conductive substrates or substrates rendered electrically conductive, in particular metal substrates, from the cathodic electrodeposition coating compositions containing the nitrites and/or nitrates and stoved in indirectly heated circulating air ovens at object temperatures of for example 160 to 190° C. The term "indirectly heated circulating air ovens" refers to circulating air ovens in which no waste gases are introduced into the circulating air of the oven and which are preferably operated without or with only a small proportion of fresh air, as is the case with the indirectly heated circulating air ovens operated in industrial practice. The volume content of fresh air, relative to the circulated volume of circulating air per unit time, is below 20%, preferably below 10%. In the process according to the invention the ratio during stoving of oven capacity to cathodic electrodeposition lacquer surface area to be stoved is preferably up to 2, for example 0.2 to 2 cubic metres per square metre or less. The dimensions can be clarified by reference to an example from standard automotive finishing: for example an industrially operated circulating air oven with a capacity of 1000 cubic metres contains a total of 25 car bodies each displaying 80 square metres of cathodic electrodeposition coating film to be stoved, the circulating air output is 150,000 cubic metres per hour with a waste air and fresh air output of 12,000 cubic metres each per hour. To simulate the stoving process in an indirectly heated circulating air oven operated in industrial practice a laboratory circulating air oven can be used, the proportion of fresh air in which can be restricted to below 20, preferably below 10% and in which a ratio of 0.2 to 2 cubic metres of oven capacity per square metre of cathodic electrodeposition coating to be stoved is preferably maintained.

The process according to the invention or the use according to the invention is suitable in particular for the motor vehicle sector, for example for the production of an anti-corrosive cathodic electrodeposition primer on vehicle bodies or vehicle body components, which are then provided with further coating films, in particular underbody sealant films, for example.

The conventional underbody sealant films used in vehicle finishing can be applied. Examples include coating compositions based on polyvinyl chloride (PVC) plastisols. These are applied in particular to locations in the vehicle underbody area that are at risk of impact from flying stones. They are generally applied in thick coats, for example from 0.5 to 3 mm.

Without giving a definite explanation, it is assumed as a theoretical explanation that the nitrites and/or nitrates codeposited in the process according to the invention as a component of the cathodic electrodeposition coating film decompose at the air temperatures of for example 150 to 220° C. that prevail during stoving to release nitrogen oxides, referred to below as $NO_x$, and the $NO_x$, given off into the circulating air in the oven gives rise to an improved or adequate adhesion of coating films that are subsequently applied.

The process according to the invention ensures a good adhesion of subsequent coating films, such as in particular underbody sealant films, for example, that are applied to cathodic electrodeposition coating films stoved in indirectly heated circulating air ovens. Conceivable measures for improving adhesion such as the use of expensive bonding agents in the coating compositions used for application of the subsequent coating films can also be avoided.

EXAMPLE 1

Production of Bismuth Lactate 901 parts of a 70 wt. % solution of lactic acid in water are heated to 70° C. 466 parts of commercial bismuth oxide ($Bi_2O_3$) are added in portions with stirring. After stirring for a further 6 hours at 70° C. the batch is cooled to 20° C. and left for 12 hours without stirring. Finally the deposit is filtered off, washed with a little water and ethanol and dried at 50° C.

EXAMPLE 2

Production of a CEC Dispersion a) 832 parts of the monocarbonate of an epoxy resin based on bisphenol A (commercial product Epikote 828) are mixed with 830 parts of a commercial polycaprolactone polyol (commercial product CAPA 205) and 712 parts of diglycol dimethyl ether and reacted at 70 to 140° C. with 0.3% $BF_3$ etherate until an epoxy value of 0 is reached. 307 parts of a reaction product of 174 parts of toluylene diisocyanate (2 equivalents of NCO) with 137 parts of 2-ethyl hexanol with an NCO content of 12.8% are added to this product (solids content 70%, 2 equivalents of carbonate) at 40 to 80° C. in the presence of 0.3% Zn acetyl acetonate as catalyst. The reaction is continued until an NCO value of 0 is reached and the solids content then adjusted to 70% with diglycol dimethyl ether.

b) 618 parts of a reaction product of 348 parts of toluylene diisocyanate (80% 2,4-isomer; 20% 2,6-isomer) with 274 parts of 2-ethyl hexanol with a residual NCO content of 12.8% are slowly added to 1759 parts of a biscarbonate of an epoxy resin based on bisphenol A (commercial product Epicote 1001) at 60 to 80° C. The reaction is continued until an NCO value of 0 is reached and the solids content then adjusted to 70% with diglycol dimethyl ether.

c) 622 parts of the reaction product of 137 parts of 2-ethyl hexanol with 174 parts of toluylene diisocyanate (NCO content 12.8%) are added to 860 parts of bishexamethylene triamine dissolved in 2315 parts of methoxy propanol at a temperature of 30° C. and reacted until an NCO content of 0 is obtained. 4737 parts of the reaction product b) and 3246 parts of the reaction product a) (70% in diglycol dimethyl ether in each case) are then added and reacted at 60 to 90° C. The reaction is terminated at an amine value of 32 mg KOH/g. The resulting product is distilled off in vacuo down to a solids content of 85%.

d) Neutralisation is performed with 30 mmol formic acid/100 g resin. The product is then heated to 70° C. and bismuth lactate added in portions with stirring in a quantity such that 1 wt. % bismuth is present relative to the solids content in the batch. Stirring is then continued for a further 6 hours at 60° C. and the product cooled. It is converted with deionised water to a dispersion with a solids content of 40 wt. %.

EXAMPLE 3

Production of a Pigment Paste 15 parts acetic acid (50%), 30 parts of a commercial wetting agent (50%) and 350 parts deionised water are added to 223 parts of the paste resin according to EP-A-0 469 497 A1 example 1 (55%) in a high-speed mixer. 12.3 parts of carbon black and 430 parts of titanium dioxide are added. The solids content is adjusted to 53 wt. % with deionised water and it is ground in a bead mill. A stable pigment paste is obtained.

EXAMPLE 4

Production of a Pigment Paste

Example 3 is repeated, whereby 20.5 parts of 65 wt. % cellulose nitrate (65 parts cellulose nitrate with a nitrogen content of 11 wt. %, wetted with 35 parts butanol) are added before addition of the acetic acid.

EXAMPLE 5

Production of a CEC Bath and Coating, Comparison

A CEC bath with a solids content of 20 wt. % and a ratio by weight of pigment to binder of 0.5:1 is produced by conventional means by mixing the CEC dispersion from example 2 with deionised water, adding the pigment paste from example 3 and stirring well. Using the CEC bath adjusted with formic acid to an acid content of 35 milliequivalents/100 g solids, 10 sheets (measuring 10 cm by 20 cm) of conventional phosphated car body steel were coated by cataphoresis in a dry film thickness in each case of 20 μm and stoved for 30 minutes at 160° C. (object temperature) in an electrically heated laboratory circulating air oven with a capacity of 0.5 cubic metres (air temperature 220° C., fresh air proportion limited to below 8%).

EXAMPLE 6

According to the Invention

Example 5 is repeated with the difference that the pigment paste from example 4 is used in place of the pigment paste from example 3. The CEC bath contains 1.5 wt. % cellulose nitrate, calculated with respect to the resin-solids.

EXAMPLE 7

Comparison

Example 6 is repeated with the difference that the laboratory circulating air oven is operated with the maximum supply of fresh air.

CEC-coated sheets obtained in examples 5 to 7 are each coated with a PVC plastisol-based commercial underbody sealant material in a film thickness of 2 mm using a knife and stoved for 20 minutes at 140° C. (object temperature) in order to solvate the plastisol. Parallel incisions are made in the solvated plastisol film at intervals of 1.5 cm. At the edge between two incisions the solvated plastisol is carefully detached from the CEC coating with a knife in order to obtain a tab. An attempt is then made to peel away the plastisol film by hand. The adhesion is acceptable only in the case of example 6. In examples 5 and 7 the solvated plastisol film can be peeled away from the CEC substrate.

The invention claimed is:

1. A process for the production of an electrodeposition coating film with improved adhesion for subsequent coats comprising the steps of cathodically depositing a coating film from a cathodic electrodeposition coating composition onto an electrically conductive substrate and baking the film in an indirectly heated circulating air oven; wherein a proportion of fresh air introduced into the oven is 0 to 20 volume % of the circulating air in the oven; and
wherein the cathodic electrodeposition coating composition comprises resin solids and at least one water-insoluble nitrogen compound selected from the group consisting of organic ester nitrites, organic ester nitrates and mixtures thereof.

2. The process of claim 1 wherein the water insoluble nitrogen compound is present in the cathodic electrodeposition coating composition in an amount of 0.05 to 0.5 wt. %, calculated as nitrogen present in the form of organically bonded nitrite, nitrate or mixture of nitrite and nitrate, relative to the resin solids of the coating composition.

3. The process of claim 2 wherein the water insoluble nitrogen compound is selected from the group consisting of esters of nitrous acid and a mono-hydroxy functional polymer, esters of nitrous acid and a polyhydroxy functional polymer, esters of nitric acid and a mono-hydroxy functional polymer, esters of nitric acid and a polyhydroxy functional polymer and any mixtures thereof.

4. The process of claim 3 wherein the water insoluble nitrogen compound consists of a cellulose nitrate.

5. The process of claim 4 wherein the cellulose nitrate has a content of nitrogen bonded as nitrate of 6.7 to 12.5 wt. %, relative to the resin solids of the coating composition.

6. The process of claim 1 wherein the ratio of oven capacity to surface area of the electrically conductive substrate being coated with the electrodeposition coating composition is up to 2 cubic meters per square meter of substrate.

7. The process of claim 1 wherein more than one electrodeposition coating film is applied to the substrate.

8. The process of claim 1 wherein the electrodeposition coating film is applied to a motor vehicle body and an underbody sealant film is then applied to a portion of the motor vehicle body.

9. The process of claim 1 wherein the electrodeposition coating film is applied to a motor vehicle body part and an underbody sealant film is then applied to a portion of the motor vehicle body part.

* * * * *